United States Patent
Möller (10) Patent No.: US 11,858,383 B2
(45) Date of Patent: Jan. 2, 2024

(54) VEHICLE SEAT WITH DIFFERENTLY SIZED SWIVEL FITTINGS

(71) Applicant: Brose Fahrzeugteile SE & Co. Kommanditgesellschaft, Coburg, Coburg (DE)

(72) Inventor: Denny Möller, Lautertal (DE)

(73) Assignee: Brose Fahrzeugteile SE & Co. Kommanditgesellschaft, Coburg, Coburg (DE)

( * ) Notice: Subject to any disclaimer, the term of this patent is extended or adjusted under 35 U.S.C. 154(b) by 0 days.

(21) Appl. No.: 17/772,836

(22) PCT Filed: Oct. 26, 2020

(86) PCT No.: PCT/EP2020/080016
§ 371 (c)(1),
(2) Date: Apr. 28, 2022

(87) PCT Pub. No.: WO2021/083830
PCT Pub. Date: May 6, 2021

(65) Prior Publication Data
US 2022/0402406 A1    Dec. 22, 2022

(30) Foreign Application Priority Data
Oct. 29, 2019   (DE) .................... 10 2019 216 677.6

(51) Int. Cl.
*B60N 2/20* (2006.01)
*B60N 2/235* (2006.01)

(52) U.S. Cl.
CPC ............ *B60N 2/20* (2013.01); *B60N 2/235* (2013.01); *B60N 2/2362* (2015.04)

(58) Field of Classification Search
CPC ........................................ B60N 2/235–2362
See application file for complete search history.

(56) References Cited

U.S. PATENT DOCUMENTS

| | | | |
|---|---|---|---|
| 4,713,986 A * | 12/1987 | Cremer | B60N 2/2252 475/180 |
| 2012/0086254 A1 | 4/2012 | Schüler et al. | |
| 2013/0009439 A1 | 1/2013 | Jokiel et al. | |
| 2013/0175842 A1 | 7/2013 | Prause et al. | |
| 2013/0278035 A1 | 10/2013 | Markel et al. | |
| 2016/0185261 A1 | 6/2016 | Hammann et al. | |
| 2017/0015220 A1 * | 1/2017 | Albert Reginold | B60N 2/2356 |

(Continued)

FOREIGN PATENT DOCUMENTS

| | | |
|---|---|---|
| CN | 101274600 A | 10/2008 |
| CN | 102481868 A | 5/2012 |
| CN | 102781718 A | 11/2012 |

(Continued)

OTHER PUBLICATIONS

Chinese Office Action for Application No. 202080073703.0, dated Mar. 22, 2023, English Translation attached to original, All together 17 Pages.

*Primary Examiner* — Syed A Islam
(74) *Attorney, Agent, or Firm* — Dickinson Wright PLLC (57) ABSTRACT

A vehicle seat comprises a seat part and a backrest, which are pivotally connected to each other via at least two swivel fittings, and the swivel fittings each have toothing rolling off on each other and are different in size.

9 Claims, 5 Drawing Sheets

(56) References Cited

U.S. PATENT DOCUMENTS

2019/0106025 A1    4/2019  Smuk

FOREIGN PATENT DOCUMENTS

| CN | 103079880 | A  | 5/2013  |
|----|-----------|----|---------|
| CN | 103189235 | A  | 7/2013  |
| CN | 104853953 | A  | 8/2015  |
| DE | 1040914   | B  | 10/1958 |
| DE | 102010038795 | A1 | 2/2012 |
| DE | 102014208852 | A1 | 9/2015 |
| EP | 1974987   | A2 | 10/2008 |

* cited by examiner

VEHICLE SEAT WITH DIFFERENTLY SIZED SWIVEL FITTINGS

CROSS-REFERENCE TO RELATED APPLICATIONS

This application is the U.S. National Phase of PCT Application No. PCT/EP2020/080016 filed on Oct. 26, 2020, which claims priority to German Patent Application No. DE 10 2019 216 677.6, filed on Oct. 29, 2019, the disclosures of which are hereby incorporated in their entirety by reference herein.

TECHNICAL FIELD

This present disclosure relates to a vehicle seat including a seat part for a vehicle seat and a backrest for a vehicle seat.

BACKGROUND

Backrests of vehicle seats regularly are pivotally mounted via two fittings on a seat part of the vehicle seat. In swivel fittings, toothing meshing with each other roll off on each other in order to effect a swivel movement of the backrest relative to the seat part.

SUMMARY

One or more objects of the present disclosure may include reducing the total weight of a vehicle seat.

According to one embodiment, a vehicle seat is provided. The vehicle seat may include a seat part, a backrest and (at least) two swivel fittings by which the seat part and the backrest are pivotally connected to each other, and the swivel fittings each have toothing rolling off and on to each other. It is provided that the swivel fittings are different in size.

This is based on the finding that loads can act asymmetrically on a backrest for structural reasons. Turning away from the so far always identical configuration of swivel fittings, a different size of the swivel fittings is provided here. So, one of the swivel fittings, namely the one on the side loaded less, can be formed smaller than the other one. This can reduce the weight of the backrest with the swivel fittings and hence also the total weight of a vehicle seat with the backrest. At the same time, material costs can be saved.

One of the swivel fittings is larger and one is smaller than the respectively other of the swivel fittings. At least one dimension of one of the swivel fittings thus is smaller than the corresponding dimension of the other of the swivel fittings. The smaller swivel fitting may have a lower weight than the larger swivel fitting. The difference in size lies (distinctly) above manufacturing tolerances. For example, the larger swivel fitting is at least 5% larger, at least 10% larger or at least 20% larger than the smaller swivel fitting.

The backrest can have a belt exit point arranged on one side of the backrest. The larger one of the swivel fittings is arranged on the same side of the backrest as the belt exit point. The belt exit point is arranged e.g. above the larger swivel fitting, for example at an upper end of the backrest, while the swivel fittings are arranged at a lower end of the backrest. A seat belt to be passed through the belt exit point may be a three-point belt and/or a portion of a diagonal belt. Thus, in the event of a crash, the same leads to a stronger load acting primarily on the corresponding side of the belt exit point. On this side, the larger swivel fitting is arranged.

Several (for example all) components of the smaller one of the swivel fittings can each have the same or a similar shape and the same function as a corresponding component of the larger one of the swivel fittings.

Optionally, several (such as the majority of the components or even all) components of the smaller swivel fitting each are smaller than the corresponding component of the larger swivel fitting. The components of the swivel fittings among each other hence for example each are differently scaled variants of the same basic shape. Therefore, the two swivel fittings optionally can be swivel fittings scaled with respect to each other.

The swivel fittings may have the same gear ratio. It is thereby possible to use a rigid synchronization of the two swivel fittings in a simple way without any bracings occurring between the swivel fittings. Hence, despite differently sized swivel fittings a stable synchronization can be maintained in a simple way, which is not easily possible for example in detent fittings, in which it is often not possible to fall below certain tooth sizes and in which latching pawls engaging with a slight offset and hence not engaging completely can quickly lead to a far-reaching failure of the latching.

The toothing of the smaller swivel fitting optionally has the same number of teeth as the corresponding toothing of the larger swivel fitting. This provides for a swivel movement of the backrest with little friction.

Concretely, the smaller swivel fitting e.g. has a smaller width along the swivel axis and/or a smaller outside diameter perpendicularly to the swivel axis than the larger swivel fitting.

The toothing of the smaller swivel fitting optionally have smaller tooth widths and/or smaller outside diameters and/or pitch circle diameters than the respective toothing of the larger swivel fitting.

For example, one tooth (such as each tooth) of one of the toothing of the smaller swivel fitting has a lower loadability than a tooth (such as each tooth) of the corresponding toothing of the larger swivel fitting.

Each of the swivel fittings comprises a first fitting part with an internal toothing and a second fitting part with an external toothing. The internal toothing and the external toothing each constitute the toothing rolling off on each other.

In each of the swivel fittings for example an eccentric can act on the respective second fitting part by a rotation around an axis of rotation relative to the respective first fitting part in such a way that the toothing of the fitting parts roll off on each other in a wobbling way.

The eccentric of the smaller swivel fitting has another shape and/or another size than the eccentric of the larger swivel fitting. In both cases, the eccentricity of the eccentrics can be the same or different. Hence, the eccentrics may not be identical parts.

The eccentrics of the swivel fittings may be coupled to each other via a synchronizing shaft, and as an example may be non-rotatably held at the same. With only one manual actuating element or with only one motorized drive unit, both swivel fittings thereby can be synchronously adjusted.

According to one aspect, there is provided a seat part for a vehicle seat. The seat part comprises (at least) two swivel fittings with which the seat part can be pivotally mounted relative to (for example on) a backrest of the vehicle seat. The swivel fittings each have toothing rolling off on each other and are formed different in size. The swivel fittings may be formed as explained above in connection with the vehicle seat. Optionally, one fitting part of each of the swivel fittings each is welded to the seat part or otherwise mounted or mountable thereon, e.g. via an adapter.

According to one aspect, there is provided a backrest for a vehicle seat. The backrest comprises (at least) two swivel fittings with which the backrest can be pivotally mounted relative to (for example on) a seat part of the vehicle seat. The swivel fittings each have toothing rolling off on each other and are formed different in size. The swivel fittings may be formed as explained above in connection with the vehicle seat. Optionally, one fitting part of each of the swivel fittings each is welded to the backrest or otherwise mounted or mountable thereon, e.g. via an adapter.

BRIEF DESCRIPTION OF THE DRAWINGS

The idea underlying the invention will be explained in detail below with reference to the exemplary embodiment illustrated in the Figures. In schematic representations.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A known swivel fitting is described in, for example, DE 10 2010 038 795 A1.

In vehicle construction in general and in vehicle seats in particular, it is always desirable to provide components that fulfill specified requirements for a function and loadability with the lowest possible weight in order to reduce a fuel or energy consumption of the vehicle and/or improve its driving characteristics.

Figure 1:
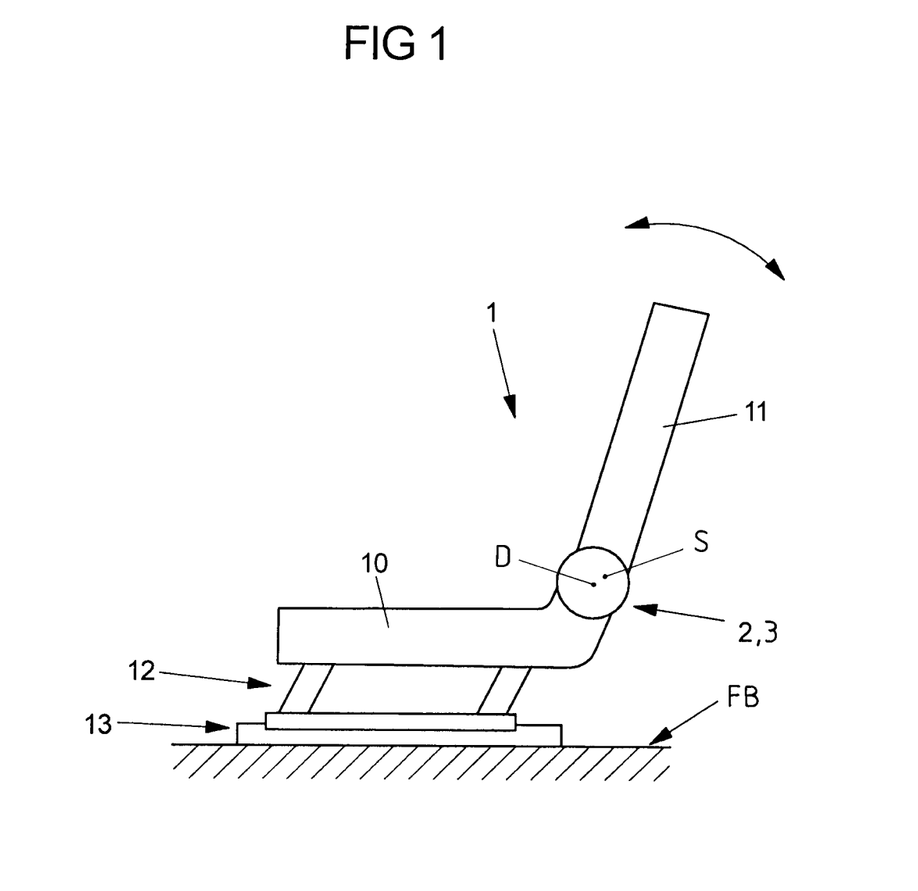
FIG. 1 shows a view of a vehicle seat.

A vehicle seat 1 schematically shown in FIG. 1 includes a seat part 10 (with a seat frame) and a backrest 11 pivotally arranged relative to the seat part 10 via an arrangement of swivel fittings 2, 3. Via the arrangement of swivel fittings 2, 3, the backrest 11 can be pivoted relative to the seat part 10 in order to adapt the tilt position of the backrest 11 relative to the seat part 10 or to bring the backrest 11 into a position pivoted forwards, for example into a flat position, for example in order to increase a storage space in a vehicle.

Such a vehicle seat 1 can be configured as a front seat in a vehicle. Such a vehicle seat 1 can, however, also be used as a rear seat in the second or third row of seats in a vehicle.

Via an optional height adjustment device 12, the vehicle seat 1 in the illustrated example is connected to a likewise optional longitudinal adjustment device 13 and is longitudinally adjustably connected to a vehicle floor FB via the longitudinal adjustment device 13.

For connecting the backrest 11 to the seat part 10, two swivel fittings 2, 3 are arranged on opposite sides of the backrest 11. The swivel fittings 2, 3 are coupled to each other for example via a synchronizing shaft so that the swivel fittings 2, 3 can be jointly actuated via the synchronizing shaft.

Figure 2:
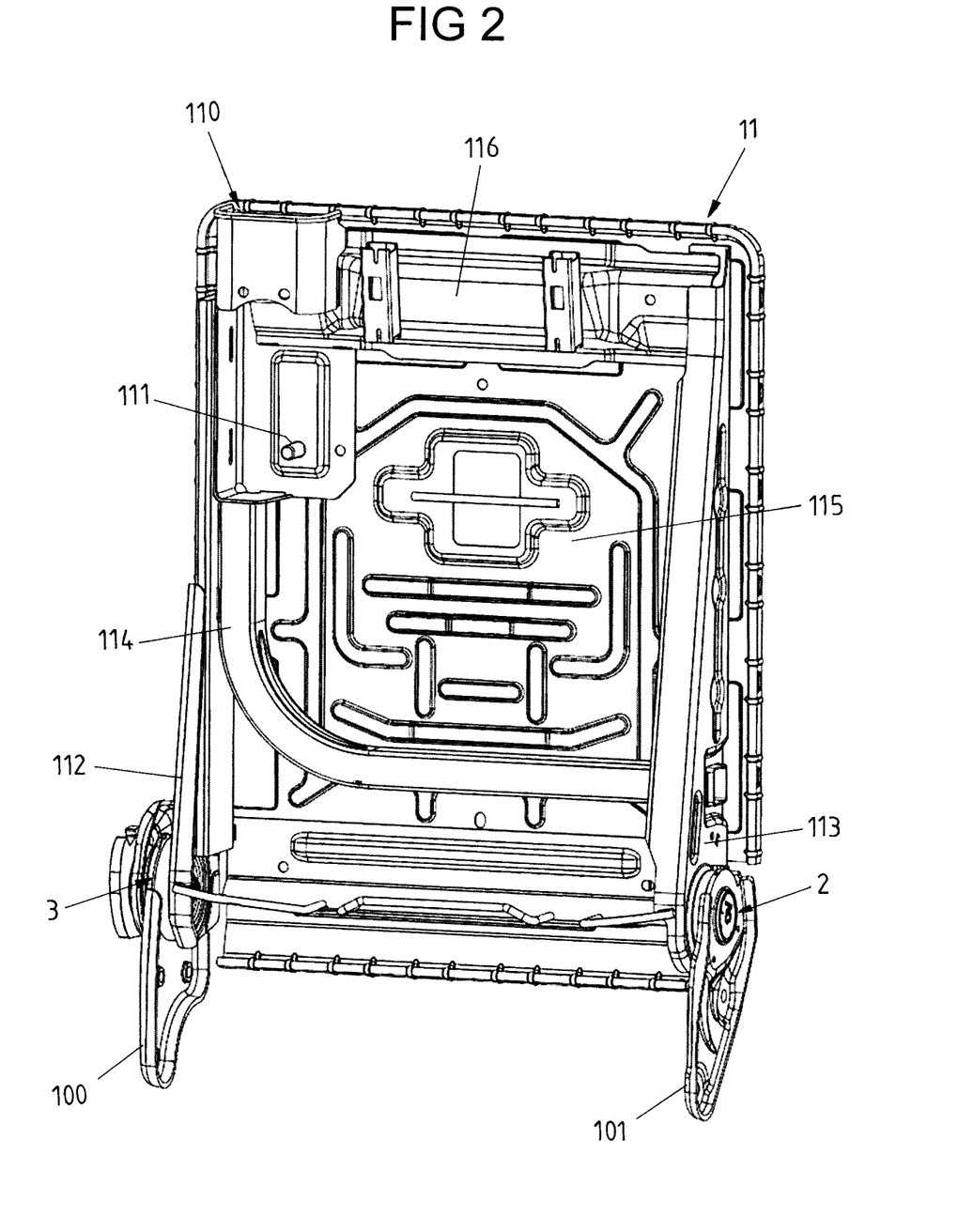
FIG. 2 shows a view of a backrest of the vehicle seat.

FIG. 2 shows the backrest 11 of the vehicle seat 1, and an optional padding or trim is not shown. The backrest 11 provides a backrest surface for (exactly) one seat.

The backrest 11 comprises a first, here left, and a second, here right, side part 112, 113, between which a rear wall 115 extends. The side parts 112, 113 are connected to each other via an upper cross-beam 116. Depending on the site of use, the design of the backrest 11 can of course be mirror-symmetrical and the reference to a left or right part in so far only serves for a simplified reference.

Adjacent to an upper end edge of the backrest 11 a belt exit point 110 is arranged, here in the form of a frame through which a seat belt (portion) to be diagonally applied can be guided. Below the belt exit point 110 a belt reel holder 111 is arranged, on which a belt reel can be mounted. Furthermore, the backrest 11 comprises a reinforcing component 114 in the form of a J-shaped or L-shaped hollow section. The reinforcing component 114 serves to transversely stiffen the backrest 11. The belt exit point 110 furthermore is arranged adjacent to a lateral edge of the backrest 11, here to the lateral edge at which the left side part 112 also extends. The side with the belt exit point 110 can also be referred to as the retractor side, and the larger swivel fitting 3 is arranged on the retractor side.

The two swivel fittings 2, 3 are formed different in size. On the left side part 112 a larger one of the swivel fittings 3 is arranged (and mounted), on the right side part 113 a smaller one of the swivel fittings 2 is arranged (and mounted). The use of a larger swivel fitting 3 on the side loaded more strongly, as compared for example to the use of three swivel fittings of equal size, two of which are jointly arranged on the side loaded more strongly, has the advantages of a particularly simple manufacture, as less welding steps must be performed, and of a reduced friction, which in turn can increase adjustment speeds and reduce adjustment times.

With respect to some or all of their components, the swivel fittings 2, 3 constitute variants scaled differently from each other.

Figure 3A:
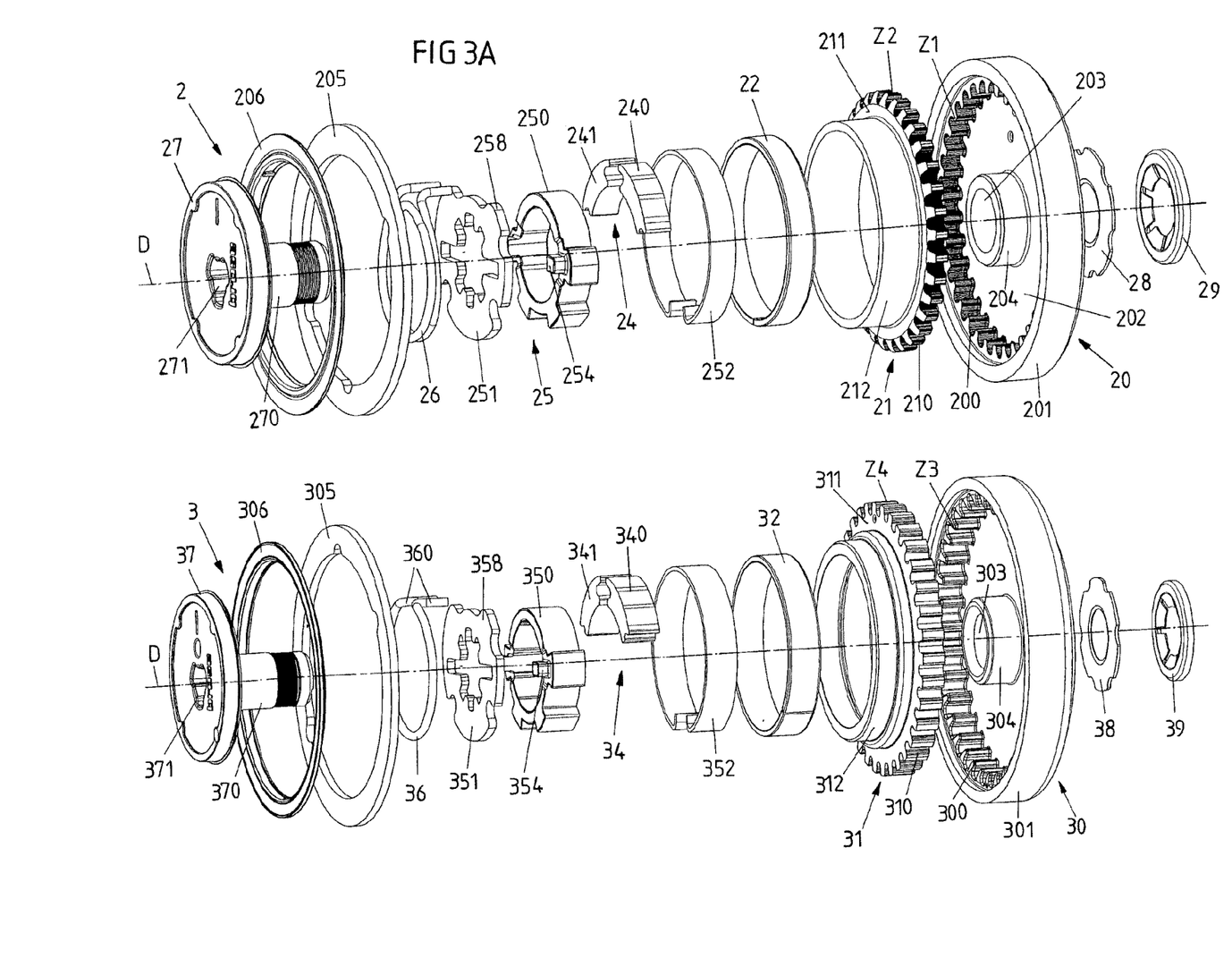
FIGS. 3A and 3B show exploded views of two different swivel fittings of the vehicle seat.
Figure 3B:
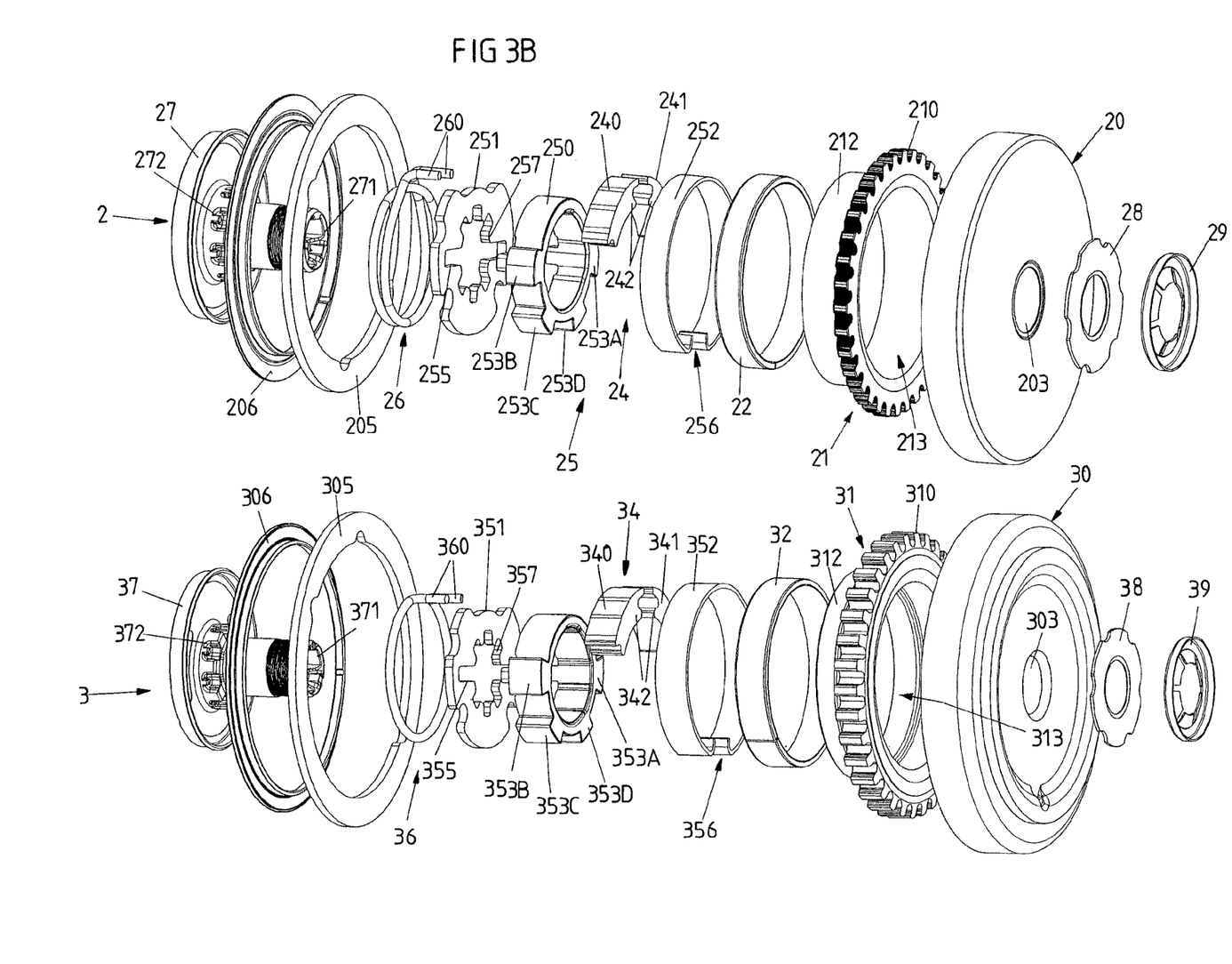

FIGS. 3A and 3B show the swivel fittings 2, 3 of the vehicle seat 1 of FIG. 1. The swivel fitting 2 shown at the top in each of FIGS. 3A and 3B is the smaller one of the swivel fittings 2, 3, and the swivel fitting 3 each shown at the bottom is the larger one.

In the following, the mode of operation of the swivel fittings 2, 3 will chiefly be explained with reference to the smaller swivel fitting 2, and the following indications concerning the smaller swivel fitting 2 analogously apply for the larger swivel fitting 3. The corresponding components of the larger swivel fitting 3 (with the exception of an actuating element 37 that has the same shape and the same size as a corresponding actuating element 27 of the smaller fitting 2) have a larger size and, when scaled correspondingly, have the same or a similar shape as the components of the smaller swivel fitting 2. The components of the larger swivel fitting 3 are provided with reference numerals beginning with 3 instead of 2.

The swivel fitting 2 (and correspondingly the swivel fitting 3) is configured as a wobbling swivel fitting. The swivel fitting 2 includes a first fitting part 20, which for example is associated to the backrest 11 (alternatively to the seat part 10) and here is firmly connected to the right side part 113 of the backrest 11. A second fitting part 21 on the other hand is associated to the seat part 10 (alternatively to the backrest 11) and for example firmly connected to a frame part of the seat part 10. Correspondingly, the fitting parts 30, 31 of the larger swivel fitting 3 are firmly connected to the left side part 112 of the backrest 11 and to a frame part of the seat part 10.

The first fitting part 20 comprises a toothing formed as an internal toothing 200. The second fitting part 21 comprises a toothing formed as an external toothing 210. Via the external toothing 210, the second fitting part is in meshing engagement with the internal toothing 200 of the first fitting part 20 extending within a circumferential wall 201 and can be adjusted relative to the first fitting part 20 in a wobbling way. The internal toothing 200 is concentric with respect to an axis of rotation D of the swivel fitting 2.

The external toothing 210 of the second fitting part 21 is formed on a circumferential flange portion 211 of the second fitting part 21. The flange portion 211 rests against a bottom portion 202 of the first fitting part 20 in such a way that the second fitting part 21 is adjustable relative to the first fitting part 20 by meshing engagement of the toothing 200, 210.

The second fitting part 21 is fixed by a holding element 205 axially of the first fitting part 20. The holding element 205 is firmly connected to the first fitting part 20 and encloses the flange portion 211 of the second fitting part 21 with respect to the bottom portion 202 of the first fitting part 20 in such a way that the second fitting part 21 is axially fixed, but adjustable relative to the first fitting part 20 in a plane perpendicular to the axis of rotation D. The holding element 205 serves as a lid. On the holding element 205, a support ring 206 is mounted.

The toothing 200, 210 differ in their number of teeth. The external toothing 210 of the second fitting part 21 has a number of teeth smaller by at least one tooth as compared to the internal toothing 200 of the first fitting part 20, which effects that when the second fitting part 21 rolls off within the first fitting part 20, the rotary position of the second fitting part 21 is changed, and thus the adjustment assembly associated to the second fitting 21 is pivoted relative to the adjustment assembly associated to the first fitting part 20.

While the first fitting part 20 is concentric with the axis of rotation D, the second fitting part 21 rotates eccentrically to the axis of rotation D within the first fitting part 20. The external toothing 210 of the second fitting part 21 is concentric with an eccentric receptacle 213 formed in the second fitting part 21. Via a collar 212 surrounding the eccentric receptacle 213, the second fitting part 21 is firmly connected or connectable to the associated adjustment assembly. In contrast to the collar 212 of the smaller swivel fitting 2, the collar 312 of the larger swivel fitting 3 has a step.

In the eccentric receptacle 213 of the second fitting part 21 a bearing bush 22 is inserted, which is e.g. firmly connected to the second fitting part 21. An eccentric 24 formed by wedge elements 240, 241 and a multi-part eccentric carrier 25 are also arranged in the eccentric receptacle 213.

The eccentric carrier 25 comprises a first carrier element in the form of an inner wedge carrier 250, a second carrier element in the form of a driver 251, and in the illustrated example also a third carrier element in the form of an outer wedge carrier 252.

The inner wedge carrier 250 is put onto a bearing pin 204 of the first fitting part and rotatably mounted thereon about the axis of rotation D. The inner wedge carrier 250 comprises an annular portion with a shell surface. The wedge elements 240, 241 rest against the shell surface and are radially inwardly supported by the inner wedge carrier 250 (with respect to the axis of rotation D). The outer wedge carrier 252 is of ring-shaped design (here in the form of an open ring) and accommodates the wedge elements 240, 241 and the inner wedge carrier 250.

The driver 251 is arranged beside the inner wedge carrier 250 and the wedge elements 240, 241 along the axis of rotation D. The wedge elements 240, 241 are supported by the driver 251 in an axial direction (with respect to the axis of rotation D). For this purpose, the driver 251 comprises a protrusion 258 which radially covers the wedge elements 240, 241 or at least overlaps the same. The wedge elements 240, 241 thereby are prevented from rising axially.

The wedge elements 240, 241 of the eccentric assembly 24 are pretensioned against each other via a spring element 26. The spring element 26 with spring ends 260 therefor acts on head ends 242 of the wedge elements 240, 241 facing each other and loads the same towards each other in the direction of an expansion. While the spring element 26 of the smaller swivel fitting 2 has two windings, the spring element 36 of the larger swivel fitting 3 has only one winding.

The wedge elements 240, 241 serve to bring the first fitting part 20 and the second fitting part 21 in meshing engagement with each other without any clearance. The wedge elements 240, 241 therefor are away from each other by action of the spring element 26 and urge the second fitting part 21 with its external toothing 210 in engagement with the internal toothing 200 of the first fitting part 20. The wedge elements 240, 241 are away from each other and wedged by action of the spring element 26. The fitting parts 20, 21 thereby are kept in meshing engagement with each other without any clearance. Via the wedging, the position of the fitting parts 20, 21 with respect to each other also is blocked in a self-locking way.

The outer wedge carrier 252 is slidingly movable relative to the bearing bush 22 and in the case of a (sufficiently far) actuation of the actuating element 27 is adjusted together with the inner wedge carrier 250 and the driver 251.

The actuating element 27 is operatively connected to the eccentric carrier 25. With a shank 270, the actuating element 27 reaches through a bearing opening 203 of the first fitting part 20 concentric with the axis of rotation D and thereby is rotatably mounted on the first fitting part 20 about the axis of rotation D. The bearing opening 203 extends through the bearing pin 204.

Via a (star-shaped) form-fit contour 272, the actuating element 27 is in positive engagement with an appropriately formed form-fit contour 257 of the driver 251 of the eccentric carrier 25 and thereby is non-rotatably connected to the driver 251 of the eccentric carrier 25. Thus, a rotation of the actuating element 27 about the axis of rotation D relative to the first fitting part 20 leads to a rotation of the driver 251 about this axis of rotation D. The actuating element 27 is configured to introduce a torque into the driver 251.

The driver 251 comprises further form-fit elements, namely in the form of slots 255, concretely two slots 255 extending along a common straight line. A pin 254 of the inner wedge carrier 250 is in engagement with each of the two slots 255 of the driver 251. During a rotation of the driver 251 about the axis of rotation D (relative to the first fitting part 20), the inner wedge carrier 250 thereby is entrained into the rotary movement. Via the slots 255 and pins 254, the driver 251 can introduce a torque into the inner wedge carrier 251. The driver 251 thus has a dual function and serves both for axially securing the wedge elements 240, 241 and for coupling the inner wedge carrier 250 to the actuating element 27.

The inner wedge carrier 250 comprises a plurality of stops 253A-253D, here in the form of one radially protruding block each. A stop 253A, 253B is associated to each of the wedge elements 240, 241 and arranged adjacent thereto in the circumferential direction. When the actuating element 27 is rotatingly actuated, the inner wedge carrier 250 rotates relative to the first fitting part 20. Depending on the direction of rotation, one of the stops 253A, 253B associated to the wedge elements 240, 241 abuts against an end portion of the corresponding wedge element 240, 241. Two further stops 253C, 23D are associated to the outer wedge carrier 252 and are arranged adjacent to an entrainment contour 256 of the outer wedge carrier 252 in the circumferential direction. The entrainment contour 256 of the outer wedge carrier 252 is formed by two open ends of the outer wedge carrier 252, which are bent over towards the inside (spaced apart from each other by a gap).

When the inner wedge carrier 250 is rotated in a swivel direction by actuating the actuating element 27, for example electromotively via a synchronizing shaft concentric with the axis of rotation D, the inner wedge carrier pivots in the swivel direction and is approached to the associated wedge element 240, 241 with one of its stops 253A, 253B. By acting on the wedge element 240, 241, this wedge element 240, 241 is approached to the other wedge element 240, 241, and the wedging effect of the wedge elements 240, 241 in the eccentric receptacle 213 thus is eliminated. The swivel fitting 2 is released in this way.

During a further rotation, the inner wedge carrier 250 with one of its further stops 253C, 253D also gets in abutment with one of the ends of the outer wedge carrier 252 and thereby entrains the outer wedge carrier 252. By action on the wedge elements 240, 241, the eccentric 24 thus is pivoted in the eccentric receptacle 213, and the second fitting part 21 thereby is adjusted relative to the first fitting part 20. In the process, the outer wedge carrier 252 is entrained.

After termination of the actuation, the wedge elements 240, 241 in turn are spread open relative to each other due to the spring action of the spring 26 and are wedged.

The actuating element 27 also includes a central form-fit opening 271 via which the actuating element 27 usually is connected to the synchronizing shaft extended along the axis of rotation D in such a way that the actuating element 27 can be adjusted manually and/or electromotively via the synchronizing shaft. Due to the wobbling rotational movement, the pivot axis S wobbles around the axis of rotation D (see also FIG. 1).

A sealing element 28 resting against the first fitting part 20 from outside and put onto the shank 270 of the actuating element 27 seals the interior space of the swivel fitting 2 against the environment. An axial securing ring 29 engages into a groove on the shank 270 of the actuating element 27 with a plurality of areas protruding to the inside and thereby secures the actuating element 27 to the first fitting part 20.

Almost all components (alternatively, all components) of the larger swivel fitting 3 are configured larger than the corresponding components of the smaller swivel fitting 2, for example the two fitting parts 30, 31. As an example, the wedge elements 240, 241 of the smaller swivel fitting 2 are each smaller than the wedge elements 340, 341 of the larger swivel fitting 3.

The toothing 200, 210 of the smaller swivel fitting 2 have both a smaller tooth width and a smaller outside diameter than the toothing 300, 3101 of the larger swivel fitting 3. The teeth Z1, Z2 of the smaller swivel fitting 2 each are smaller than the teeth Z3, Z4 of the larger swivel fitting 3. The teeth Z3, Z4 of the larger swivel fitting 3 thus are more loadable than the teeth Z1, Z2 of the smaller swivel fitting 2.

The internal toothing 200 of the first fitting part 20 of the smaller swivel fitting 2 and the internal toothing 300 of the first fitting part 30 of the larger swivel fitting 3 have the same number of teeth Z1, Z3. The external toothing 210 of the second fitting part 21 of the smaller swivel fitting 2 and the external toothing 310 of the second fitting part 31 of the larger swivel fitting 3 likewise have the same number of teeth Z2, Z4. This results in the same gear ratio for both swivel fittings 2, 3. A synchronism of the swivel fittings 2, 3 thereby is generated in a simple way.

Figure 4:
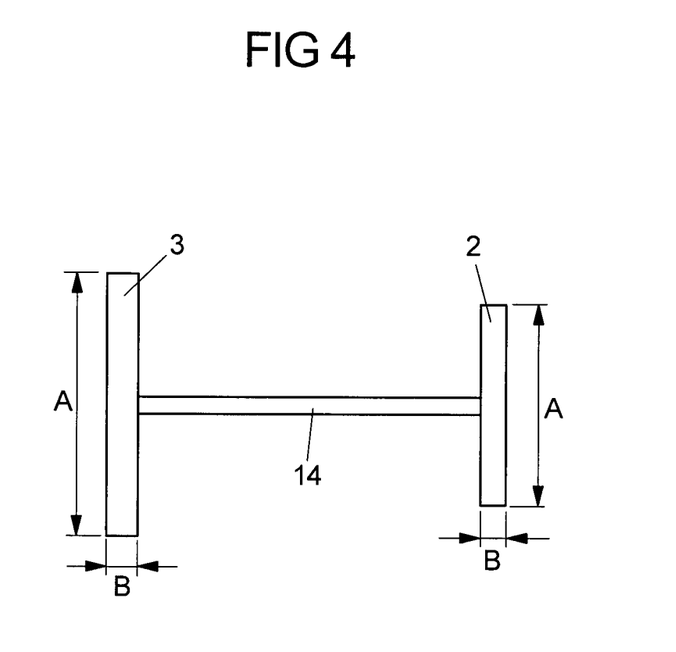
FIG. 4 shows a view of the two different swivel fittings with a synchronizing shaft.

FIG. 4 shows the two swivel fittings 2, 3 in a state coupled to the synchronizing shaft 14. Furthermore, it is illustrated that the larger swivel fitting 3 has both a larger outside diameter A and a larger width B than the smaller swivel fitting 2.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS 1 vehicle seat
10 seat part
100, 101 fitting adapter
11 backrest
110 belt exit point
111 belt reel holder
112, 113 side part
114 reinforcing component
115 rear wall
116 cross-beam
12 height adjustment device
3 longitudinal adjustment device
14 synchronizing shaft
2, 3 swivel fitting
20, 30 first fitting part
200, 300 internal toothing
201, 301 circumferential wall
202, 302 bottom portion
203, 303 bearing opening
204, 304 bearing pin
205, 305 holding element
206, 306 support ring
21, 31 second fitting part
210, 310 external toothing
211, 311 flange portion
212, 312 collar
213, 313 eccentric receptacle
22, 32 bearing bush
24, 34 eccentric
10098 240, 241, 340, 341 wedge elements
242, 342, head ends
25, 35 eccentric carriers
250, 350 inner wedge carrier
251, 351 driver
252, 352 outer wedge carrier
253A-253D, 353A-353D stop
254, 354 pin
255, 355 slot
256, 356 entrainment contour
257, 357 form-fit contour
258, 358 protrusion
259A-259D stop 26, 36 spring element
260, 360 spring ends
27, 37 actuating element
270, 370 shank
271, 371 form-fit opening
272, 372 form-fit contour
28, 38 sealing element
29, 39 axial securing ring
A outside diameter
B width
D axis of rotation
FB vehicle floor
S swivel axis
Z1-Z4 tooth While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A vehicle seat comprising:
a seat part; and
a backrest pivotally connected to the seat part via at least two swivel fittings, wherein the at least two swivel fittings each include toothing configured to roll off and on each other, and wherein a first swivel fitting of the at least two swivel fittings has a different size than a second swivel fitting of the at least two swivel fittings, wherein the second swivel fitting is smaller than the first swivel fitting, wherein at least one of the following is provided:
the toothing of the second swivel fitting has smaller tooth widths and/or smaller outside diameters than the respective toothing of the larger swivel fitting,
a tooth of a portion of the toothing of the second swivel fitting has a lower loadability than a tooth of a portion of a toothing of the first swivel fitting, and
the second swivel fitting has a second width, measured along a swivel axis of the second swivel fitting, and the first swivel fitting has a first width measured along a swivel axis of the first swivel fitting, wherein the second width is less than the first width, and wherein the second swivel fitting has a smaller outside diameter, measured perpendicular to the swivel axis, than the first swivel fitting.

2. The vehicle seat of claim 1, wherein a belt exit point is arranged on a first side of the backrest, wherein the first swivel fitting is larger than the second swivel fitting and is arranged on the first side of the backrest.

3. The vehicle seat of claim 1, wherein several components of the second swivel fitting have the same or a similar function and as the first swivel fitting.

4. The vehicle seat of claim 3, wherein each of the several components of the second swivel fitting are smaller than each of the several components of the first swivel fitting.

5. The vehicle seat of claim 1, wherein first and second swivel fittings of the at least two swivel fittings have the same gear ratio.

6. The vehicle seat of claim 1, wherein each toothing of the second swivel fitting has a second number of teeth and the toothing of the first swivel fitting has a first number of teeth, wherein the first number of teeth equals the second number of teeth.

7. A vehicle seat comprising:
a seat part; and
a backrest pivotally connected to the seat part via at least two swivel fittings, wherein the at least two swivel fittings each include toothing configured to roll off and on each other, and wherein a first swivel fitting of the at least two swivel fittings has a different size than a second swivel fitting of the at least two swivel fittings,
wherein each of the at least two swivel fittings includes a first fitting part provided with an internal toothing and a second fitting part provided with an external toothing, wherein the internal and the external toothing collectively form the toothing configured to roll off and on each other,
wherein a first swivel fitting of the at least two swivel fittings includes a first eccentric configured to act on the second fitting part of the first swivel fitting by rotating about an axis of rotation relative to the first fitting part of the first swivel fitting such that the toothing roll off and on each other, wherein a second swivel fitting of the at least two swivel fittings includes a second eccentric, and wherein at least one of the following is provided:
the second eccentric of the second swivel fitting is configured to act on the second fitting part of the second swivel fitting by rotating about an axis of rotation relative to the second fitting part of the second swivel fitting such that the toothing roll off and on each other,
the second eccentric of the second swivel fitting has a different shape than the first eccentric of the first swivel fitting, and
the second eccentric of the second swivel fitting has a different size than the first eccentric of the first swivel fitting.

8. A seat part for use in a vehicle seat, the seat part comprising:
a first swivel fitting; and
a second swivel fitting, wherein the first and second swivel fittings include toothing configured to roll off and on each other, and wherein the first swivel fitting has a different size than a second swivel fitting, wherein the seat part is configured to be pivotally mounted relative to a backrest of the vehicle seat, and wherein the first and second swivel fittings are different in size, wherein the first swivel fitting includes a first eccentric, and the second swivel fitting includes a second eccentric, and wherein
the second eccentric of the second swivel fitting has a different shape than the first eccentric of the first swivel fitting, or
the second eccentric of the second swivel fitting has a different size than the first eccentric of the first swivel fitting.

9. The vehicle seat of claim 7, wherein the first and second eccentrics of the first and second swivel fittings are coupled to each other via a synchronizing shaft.

* * * * *